(12) United States Patent
DeFrancesco et al.

(10) Patent No.: US 10,882,623 B2
(45) Date of Patent: Jan. 5, 2021

(54) ADVANCED ENVIRONMENTAL CONTROL SYSTEM IN AN INTEGRATED SPLIT PACK ARRANGEMENT WITH TWO BLEED/OUTFLOW HEAT EXCHANGERS

(71) Applicant: HAMILTON SUNDSTRAND CORPORATION, Windsor Locks, CT (US)

(72) Inventors: Gregory L. DeFrancesco, Simsbury, CT (US); Donald E. Army, Enfield, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/484,807

(22) Filed: Apr. 11, 2017

(65) Prior Publication Data
US 2018/0215472 A1 Aug. 2, 2018

Related U.S. Application Data

(60) Provisional application No. 62/451,196, filed on Jan. 27, 2017.

(51) Int. Cl.
*B64D 13/06* (2006.01)
*B64D 13/04* (2006.01)
(Continued)

(52) U.S. Cl.
CPC ............ *B64D 13/06* (2013.01); *B64D 13/04* (2013.01); *B64D 13/08* (2013.01); *B64D 13/00* (2013.01);
(Continued)

(58) Field of Classification Search
CPC ........ B64D 13/06; B64D 13/00; B64D 13/02; B64D 13/04; B64D 13/08;
(Continued)

(56) References Cited

U.S. PATENT DOCUMENTS 3,878,692 A * 4/1975 Steves ................... B64D 13/06
62/87
4,967,565 A 11/1990 Thomson et al.
(Continued)

FOREIGN PATENT DOCUMENTS

EP 3219618 A1 9/2017
EP 3248880 A1 11/2017
EP 3249198 A1 11/2017

OTHER PUBLICATIONS

Extended European Search Report for Application No. 18153925.5-1010, dated Jun. 4, 2018 (8 pp.).

*Primary Examiner* — Joseph F Trpisovsky
(74) *Attorney, Agent, or Firm* — Cantor Colburn LLP

(57) ABSTRACT

An environmental control system for providing conditioned air to a volume of an aircraft includes a ram air circuit including a ram air shell with at least one heat exchanger positioned therein. A dehumidification system is arranged in fluid communication with the ram air circuit and at least one compressing device is arranged in fluid communication with the ram air circuit and the dehumidification system. A plurality of mediums is receivable within the environmental control system. A first medium of the plurality of mediums is provided from the volume of the aircraft via at least one valve.

19 Claims, 1 Drawing Sheet

(51) Int. Cl.
*B64D 13/08* (2006.01)
*B64D 13/00* (2006.01)
*B64D 13/02* (2006.01)

(52) U.S. Cl.
CPC ...... *B64D 13/02* (2013.01); *B64D 2013/0603* (2013.01); *B64D 2013/064* (2013.01); *B64D 2013/0618* (2013.01); *B64D 2013/0648* (2013.01); *B64D 2013/0662* (2013.01); *B64D 2013/0688* (2013.01); *Y02T 50/50* (2013.01)

(58) Field of Classification Search
CPC .... B64D 2013/0603; B64D 2013/0618; B64D 2013/0662; B64D 2013/0688
USPC ............................ 62/87, 93, 172, 238.2, 401
See application file for complete search history.

(56) References Cited

U.S. PATENT DOCUMENTS

| | | | |
|---|---|---|---|
| 5,299,763 A * | 4/1994 | Bescoby | B64D 13/06 244/118.5 |
| 5,461,882 A * | 10/1995 | Zywiak | B60H 1/00007 62/401 |
| 5,704,218 A | 1/1998 | Christians et al. | |
| 5,956,960 A * | 9/1999 | Niggeman | B64D 13/06 60/785 |
| 6,070,418 A | 6/2000 | Crabtree et al. | |
| 6,257,003 B1 * | 7/2001 | Hipsky | B64D 13/06 62/402 |
| 6,981,388 B2 | 1/2006 | Brutscher et al. | |
| 7,188,488 B2 | 3/2007 | Army, Jr. et al. | |
| 7,467,524 B2 * | 12/2008 | Brutscher | B64D 13/06 62/401 |
| 7,757,502 B2 | 6/2010 | Merritt et al. | |
| 8,132,758 B2 | 3/2012 | Army et al. | |
| 9,669,936 B1 | 6/2017 | Fiterman et al. | |
| 2003/0084681 A1 | 5/2003 | Haas | |
| 2004/0194493 A1 * | 10/2004 | Army, Jr. | B64D 13/06 62/402 |
| 2006/0059942 A1 * | 3/2006 | McAuliffe | B64D 13/06 62/402 |
| 2006/0231680 A1 * | 10/2006 | Derouineau | B64D 13/02 244/118.5 |
| 2012/0285184 A1 | 11/2012 | Voinov | |
| 2015/0107261 A1 | 4/2015 | Moes et al. | |
| 2015/0251765 A1 | 9/2015 | Jonqueres et al. | |
| 2016/0311538 A1 | 10/2016 | Bruno et al. | |
| 2017/0341759 A1 | 11/2017 | Bruno et al. | |

* cited by examiner

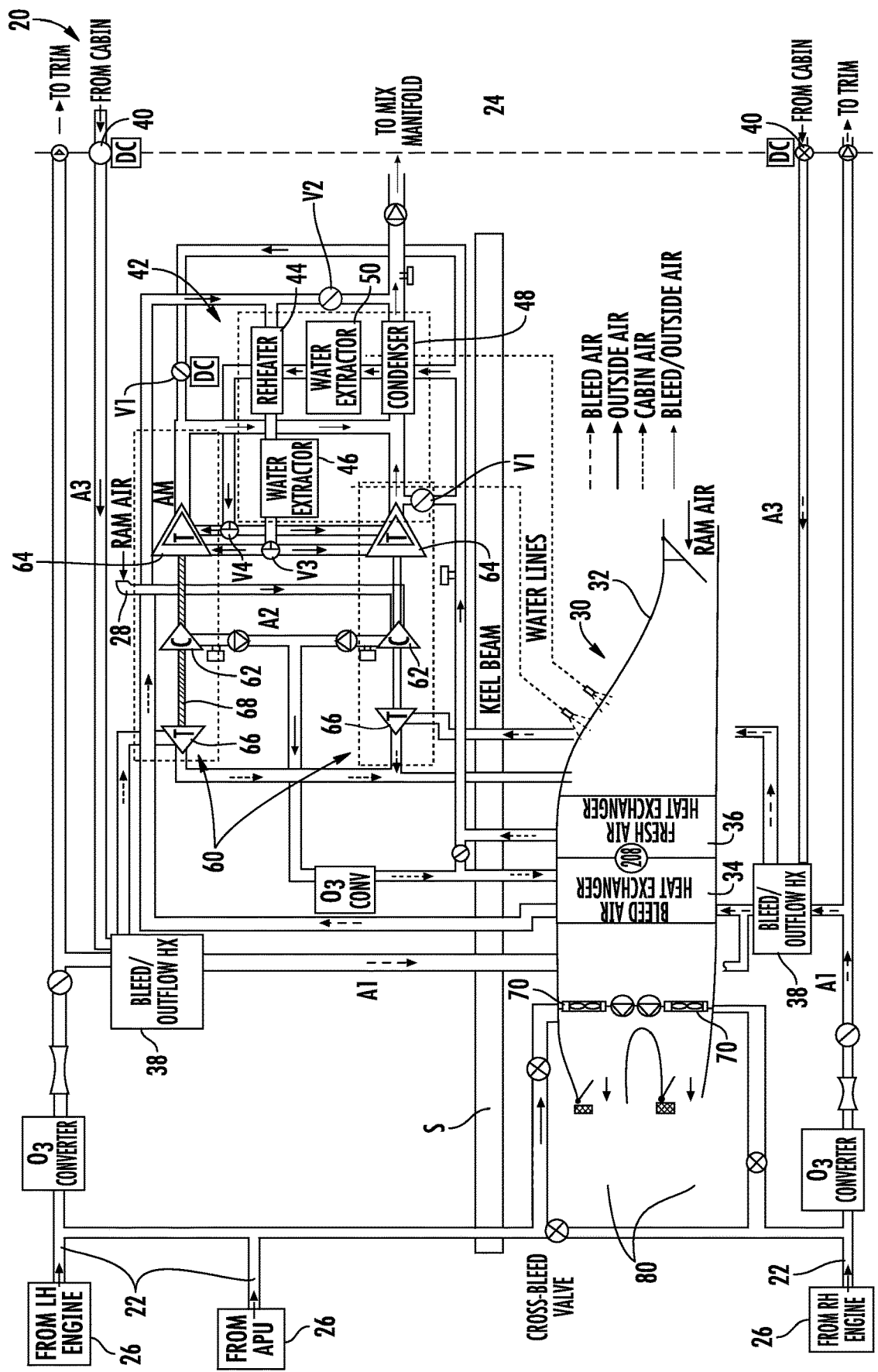

ADVANCED ENVIRONMENTAL CONTROL SYSTEM IN AN INTEGRATED SPLIT PACK ARRANGEMENT WITH TWO BLEED/OUTFLOW HEAT EXCHANGERS

CROSS REFERENCE TO RELATED APPLICATIONS

This application claims the benefit of U.S. Provisional Application No. 62/451,196, filed Jan. 27, 2017, the contents of which is incorporated by reference in its entirety herein.

BACKGROUND

Exemplary embodiments pertain to the art of environment control systems and, in particular, to an aircraft environmental control system (ECS) split pack with two bleed/outflow heat exchangers.

In general, contemporary air conditioning systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn. An approach using bleed and cabin outflow air to power a split integrated refrigeration package, offering the operational redundancy of a typical two-pack ECS is described herein.

BRIEF DESCRIPTION

According to an embodiment, an environmental control system for providing conditioned air to a volume of an aircraft includes a ram air circuit including a ram air shell with at least one heat exchanger positioned therein. A dehumidification system is arranged in fluid communication with the ram air circuit and at least one compressing device is arranged in fluid communication with the ram air circuit and the dehumidification system. A plurality of mediums is receivable within the environmental control system. A first medium of the plurality of mediums is provided from the volume of the aircraft via at least one valve.

In addition to one or more of the features described above, or as an alternative, in further embodiments comprising at least one outflow heat exchanger is positioned upstream from the ram air circuit, the outflow heat exchanger being configured to transfer heat between a second medium of the plurality of mediums and the first medium.

In addition to one or more of the features described above, or as an alternative, in further embodiments the at least one valve is operable to control a flow of the first medium to the at least one outflow heat exchanger.

In addition to one or more of the features described above, or as an alternative, in further embodiments the at least one valve includes an independently operable first valve and second valve, and the at least one outflow heat exchanger includes a first outflow heat exchanger and a second outflow heat exchanger, the first valve being operable to control a flow of the first medium to the first outflow heat exchanger and the second valve being operable to control a flow of the first medium to the second outflow heat exchanger.

In addition to one or more of the features described above, or as an alternative, in further embodiments the ram air circuit is mounted adjacent a first side of a structural component and the at least one compressing device is arranged adjacent a second side of the structural component.

In addition to one or more of the features described above, or as an alternative, in further embodiments the at least one compressing device includes: a turbine and a compressor operably coupled via a shaft and a fan operably coupled to the ram air circuit, wherein the at least one compressing device is arranged non-linearly with the ram air circuit such that an axis of rotation of the fan is offset from an axis of rotation of the shaft.

In addition to one or more of the features described above, or as an alternative, in further embodiments the fan is a tip turbine fan.

In addition to one or more of the features described above, or as an alternative, in further embodiments the at least one compressing device includes a plurality of compressing devices arranged in parallel.

In addition to one or more of the features described above, or as an alternative, in further embodiments the plurality of compressing devices are substantially identical.

In addition to one or more of the features described above, or as an alternative, in further embodiments comprising at least one compressing device valve operable to control a flow of one of at least one of the plurality of mediums to the plurality of compressing devices.

In addition to one or more of the features described above, or as an alternative, in further embodiments in a first position, the at least one compressing device valve is configured to direct the flow to only a portion of the plurality of compressing devices.

In addition to one or more of the features described above, or as an alternative, in further embodiments in a second position, the at least one compressing device valve is configured to direct the flow of fluid to each of the plurality of compressing devices.

In addition to one or more of the features described above, or as an alternative, in further embodiments the ram air circuit includes a plurality of independent outlets formed in the shell.

In addition to one or more of the features described above, or as an alternative, in further embodiments at least one outlet is associated with each of the plurality of compressing devices.

In addition to one or more of the features described above, or as an alternative, in further embodiments the at least one compressing device includes a turbine having a first inlet and a second inlet configured to provide energy by expanding one or more of the plurality of mediums, the first inlet being configured to receive a second medium of the plurality of mediums and the second inlet being configured to receive a third medium of the plurality of mediums.

In addition to one or more of the features described above, or as an alternative, in further embodiments the compressor of the at least one compressing device is configured to receive energy from at least one of the second medium and the third medium being expanded across the turbine, the compressor being configured to compress the third medium.

In addition to one or more of the features described above, or as an alternative, in further embodiments the environmental control system is operable in a plurality of modes, and during operation in at least one of the plurality of modes, the second medium and the third medium are mixed within the turbine.

In addition to one or more of the features described above, or as an alternative, in further embodiments the environmental control system is operable in a plurality of modes, and during operation in at least one of the plurality of modes, the second medium and the third medium are mixed downstream from the turbine.

In addition to one or more of the features described above, or as an alternative, in further embodiments the second medium is bleed air and the third medium is fresh air.

In addition to one or more of the features described above, or as an alternative, in further embodiments the at least one compressing device further includes a power turbine configured to provide energy to the compressor by expanding the first medium of the plurality of mediums.

In addition to one or more of the features described above, or as an alternative, in further embodiments the first medium of the one or more mediums is cabin discharge air provided from a pressurized area of the aircraft.

In addition to one or more of the features described above, or as an alternative, in further embodiments the bleed air circuit is operably coupled to a first engine, a second engine, and an auxiliary power unit.

BRIEF DESCRIPTION OF THE DRAWINGS

The following descriptions should not be considered limiting in any way. With reference to the accompanying drawings, like elements are numbered alike:

FIG. 1 is schematic illustration of an environmental control system of according to an embodiment.

DETAILED DESCRIPTION

A detailed description of one or more embodiments of the disclosed apparatus and method are presented herein by way of exemplification and not limitation with reference to the FIGURES.

Embodiments herein provide an environmental control system of an aircraft that mixes mediums from different sources and uses the different sources to power the environmental control system and to provide cabin pressurization and cooling at high fuel burning efficiency. The mediums described herein are generally types of air; however, it should be understood that other mediums, such as gases, liquids, fluidized solids, or slurries are also contemplated herein.

With reference now to FIG. 1, a schematic diagram of an environment control system (ECS) is depicted according to non-limiting embodiments. Although the environmental control system 20 is described with reference to an aircraft, alternative applications are also within the scope of the disclosure.

As shown in the FIG., the system 20 can receive a first medium A1 at at least one first inlet 22 and provide a conditioned form of the first medium A1 to a volume 24. The conditioned form of the first medium A1 provided to the volume 24 may be independent or may be a component of a mixed medium AM, as described in more detail below. In embodiments where the environmental control system 20 is used in an aircraft application, the first medium A1 is bleed air, which is pressurized air originating from i.e. being "bled" from, an engine or auxiliary power unit of the aircraft, illustrated schematically at 26. Note that one or more of the temperature, humidity, and pressure of the bleed air can vary based upon a compressor stage and revolutions per minute of the engine.

The system 20 can receive a second medium A2 from an inlet 28 and provide a conditioned form of the second medium A2 to the volume 24, for example as a portion of the mixed medium AM. In an embodiment, the second medium A2 is fresh air, such as outside air for example. The outside air can be procured via one or more scooping mechanisms, such as an impact scoop or a flush scoop for example. Thus, the inlet 28 can be considered a fresh air inlet or an outside air inlet. Generally, the fresh air A2 described herein is at an ambient pressure outside of the aircraft with respect to altitude.

The system 20 can further receive a third medium A3 from the volume 24. In an embodiment, the third medium A3 is cabin discharge air, which is air leaving the volume 24 and is discharged overboard. For example, the cabin discharge air A3 can be supplied to a destination, such as an outlet. Examples of the outlet can include, but are not limited to, a ram circuit and/or an outflow valve (which exhaust overboard).

The system 20 is configured to extract work from the third medium A3. In this manner, the pressurized air of the volume 24 can be utilized by the system 20 to achieve certain operations required at different altitudes. Thus, based on modes of operation, the system 20 can mix the first medium A1, the second medium A2, and/or the third medium A3 to produce the mixed medium AM. The mixed medium AM can be mixed air that meets fresh air requirements set by aviation organizations.

The environmental control system (ECS) 20 includes a RAM air circuit 30 including a shell or duct 32 within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a primary heat exchanger 34 and a secondary heat exchanger 36. Within the primary and secondary heat exchangers 34, 36, ram air, such as outside air for example, acts as a heat sink to cool the first medium A1, for example bleed air, and/or the second medium A2, for example fresh air. In a non-limiting embodiment, an exhaust of the cabin discharge air A3 can be released through the shell 32 of the ram circuit 30 and used in conjunction or in place of the ram air.

The system 20 additionally includes at least one outflow heat exchanger 38. In the illustrated, non-limiting embodiment, a first outflow heat exchanger 38 is arranged downstream from a first inlet 22 and a second outflow heat exchanger 38 is arranged downstream from a second inlet 22. Each of the outflow heat exchangers 38 is configured to reduce a temperature of the first medium A1 provided thereto. The third medium A3, such as exhaust of cabin air for example, is recirculated to the system 20 from the pressurized volume 24, through a valve 40. Each valve 40 provides a bulkhead penetration where air can be provided from the pressurized area of the volume 24 to the unpressurized area containing the ECS 20.

As shown, the third medium A3 may be selectively provided via operation of the valves 40 to a corresponding outflow heat exchanger 38, where heat is transferred to the third medium A3 via a heat exchange relationship with the first medium A1, before both mediums are provided to another component of the system 20. The first medium A1 output from each outflow heat exchanger 38 is provided to the ram air circuit 30. In the illustrated, non-limiting embodiment, the first medium A1 output from the outflow heat exchangers 38 is provided to the primary heat exchanger 34. The third medium output from each outflow heat exchanger 38 is provided to a corresponding component, such as a turbine of a compressing device, to be described in more detail below.

The system 20 also comprises a dehumidification system 42 including a reheater 44, a water extractor 46, a condenser 48, and another water extractor 50. The water extractors 46 and 50 are mechanical devices that perform a process of removing water from a medium. The reheater 44 and condenser 48 are particular types of heat exchangers. In a non-limiting embodiment, a reheater 44 and/or a water extractor 46 can combine to form a high pressure water separator that removes moisture at a highest pressure within an environmental control system 20 (e.g., downstream of the primary heat exchanger 34). A low-pressure water separator, such as formed by combined operation of the condenser 48 and water extractor 50, may be configured to remove moisture at a lowest pressure within an environmental control system 20, such as at a turbine discharge pressure (e.g., mixed air exiting the turbine).

At least one compressing device 60 is arranged in fluid communication with the ram air circuit 30 and the dehumidification system 42. In the illustrated, non-limiting embodiment, the system 20 includes a pair of compressing devices 60 arranged in parallel. However, a system 20 including more than two compressing devices 60 is also contemplated herein. The compressing devices 60 of the system 20, may, but need not be substantially identical.

Each compressing device 60 includes a compressor 62, a turbine 64, a power turbine 66, operably coupled via a shaft 68. The compressor 62 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 62 is configured to receive and pressurize the second medium A2.

The turbine 64 and the power turbine 66 are mechanical devices that expand and extract work from a medium (also referred to as extracting energy). In the compressing devices 60, the turbines 64, 66 drive the compressor 62 via the shaft 68. The turbine 64 can be a dual entry turbine that includes a plurality of inlet gas flow paths, such as an inner flow path and an outer flow path, to enable mixing of alternative medium flows at the exit of the turbine. The inner flow path can be a first diameter, and the outer flow path can be a second diameter. The power turbine 66 can provide power assist to the turbine based on a mode of operation the system. In a non-limiting embodiment, the turbine 64 can comprise a first nozzle configured to accelerate the first medium A1 for entry into a turbine impeller and a second nozzle is configured to accelerate the second medium A2 for entry into the turbine impeller. The turbine impeller (not shown) can be configured with a first gas path configured to receive the first medium A1 from the first nozzle and with a second gas path configured to receive the second medium A2 from the second nozzle.

Conventional compressing devices 60 additionally include a fan mounted to the shaft 68, and associated with the ram air circuit of the system 20. The fan 70 is a mechanical device that can force via push or pull methods a medium (e.g., ram air) through the shell 32 across the heat exchangers 34, 36 and at a variable cooling to control temperatures. Operation of the compressing device, specifically rotation of the shaft 68 about its axis, would operate the fan, which would draw air, such as ram air for example, through the ram air circuit 30 and discharge the air overboard. In the illustrated, non-limiting embodiment, the ram air circuit 30 and the at least one compressing device 60 are mounted in a non-linear relationship, for example on opposing sides of a structural member S of an aircraft. As a result, the at least one fan 70 associated with each compressing device 60 and operable to draw air through the ram air circuit 30 is not mounted to or driven by the shaft 68 of the compressing device 60. Rather, the axis of the fan is offset from the axis of the shaft. Accordingly, the fans 70 disclosed herein are driven by a separate power source. Any suitable fan 70 is contemplated herein, for example an electric fan or a tip turbine fan.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a pair of valves V1 control whether a portion of the flow of second medium A2 from the secondary heat exchanger 36 bypasses a pass through the dehumidification system 42 and the turbine 64 in accordance with a mode of the system 20. Similarly, a second valve V2 is configured to operable to direct a portion of the flow of first medium A1 from the primary heat exchanger to bypass the dehumidification system 42 and compression devices 60.

As previously described, the system 20 includes a plurality of compressing devices 60 operably coupled to the ram air circuit 30 and the dehumidification system 42 in parallel. Accordingly, a valve may be arranged at each location where a medium is provided to at least one compression device. For example, in the illustrated non-limiting embodiment, a third valve V3 is arranged upstream from a first inlet of the turbine 64, a fourth valve V4 is arranged upstream from a second inlet of the turbine 64. Each of these valves V3-V4 is operable to direct a flow of medium into a portion (i.e. only one) or each of the compressing devices 60. In an embodiment, the system 20 is configured through the use of these valves to operate with reduced performance when only a portion of the compressing devices 60 are operational.

Note that a combination of components and elements of the system 20 can be referred to as an air conditioning package or a pack. The pack can exist between the inlet, the volume, the outlet, and an exhaust of the shell. In the illustrated, non-limiting embodiment, the system configuration is considered an integrated air conditioning pack because the flow from a single ram air circuit 30 and a single dehumidification system 42 is shared by each of the compression devices 60.

Operation of the system 20 will now be described with respect to an aircraft. The system 20 can be referred to as an advanced pneumatic system that mixes fresh air (e.g., the second medium A2) with bleed air (e.g., the first medium A1) to produce mixed air (e.g., the mixed medium AM) according to these operational embodiments. The (dual entry) turbine 64, the compressor 62, and the fan 70 can receive energy from or impart energy to the bleed air A1, the cabin discharge air A3, and the fresh air A2.

During a first mode of operation of the system 20, energy extracted from the bleed air A1 via the turbine 64 is used to power the compressor 62 to compress the fresh air A2. In the first mode of operation, the valve 40 operable to provide cabin discharge air to the system 20 is closed. As a result, the bleed air A1 drawn from either an engine or the auxiliary power unit (e.g., the inlet 22) passes through the outflow heat exchanger to 38 the primary heat exchanger 34, with no or minimal heat transfer occurring within the outflow heat exchanger 38. The primary heat exchanger 34 cools the bleed air A1 to a nearly ambient temperature to produce cool bleed air. Valve V2 is arranged within a conduit, downstream from the primary heat exchanger 34. When the valve V2 is in a first position, after being cooled in the primary heat exchanger 34, the flow of bleed air A1 is configured to bypass the remainder of the system 20 and is directed into the volume 24. When the valve V2 is in a second position, the cool bleed air A1 is provided to the dehumidification assembly 42.

Within the dehumidification assembly 42, the cool bleed air A1 is first provided to the reheater 44, where the temperature of the bleed air A1 is increased. From the reheater 44, the warm bleed air flows through the water extractor 46 where moisture is removed to produce a warm, dry bleed air. From the dehumidification assembly 42, the warm, dry bleed air A1 is provided to the turbine 64 of one or both of the compression devices 60. In an embodiment, the warm, dry bleed air enters the turbines 64 through a first nozzle, where it is expanded and work is extracted.

The work extracted by the turbine 64 of one or both compression devices 60, is used by a corresponding compressor 62 used to compress the fresh air. The compressed fresh air A2 output from the compressor 62 has an increased temperature and pressure relative to the fresh air provided to the inlet of the compressor 62.

The increased pressure fresh air from the compressor 62 of at least one of the compression devices 60 is then provided to the secondary heat exchanger 36, where it is cooled by ram air, moved there through via the one or more fans 70. Within the secondary heat exchanger 36, the fresh air A2 may be cooled to nearly ambient temperature to produce cool pressurized fresh air before being provided to a downstream portion of the system 20. Because the fans 70 are separated from the compressing devices 60, the fan are operated by another source to move ram air through the ram air heat exchangers (e.g., the primary heat exchanger 34 and the secondary heat exchanger 36). In an embodiment, the fans 70 are fluidly connected to the bleed air inlet 22 such that pressurized bleed air supplied thereto drives operation of the fans 70.

Valves V1 are arranged downstream from the secondary heat exchanger 36 and upstream form the turbines 64. When the valves V1 are in a first position, after being cooled in the secondary heat exchanger 36, the flow of fresh air A2 is configured to bypass a pass through the dehumidification system and the turbines 64. As a result, when the valves are in the first position, at least a portion of the fresh air A2 output from the secondary heat exchanger 36 is provided directly to the condenser 48, where it is cooled, before being directed into the volume 24. When the valves V1 are in a second position, the fresh air A2 is provided to the dehumidification assembly 42.

Within the dehumidification assembly 42, the cool pressurized fresh air A2 is provided to a condenser 48, where the fresh air is cooled, and then to a water extractor 50 where any free moisture in the pressurized fresh air A2 is removed to produce dry pressurized fresh air. This dry, pressurized fresh air is heated within the reheater 44 before being provided to the turbine 64 of at least one compression mechanism 60 through a second nozzle. Within the turbine 64, the dry, warm pressurized fresh air A2 is expanded and work is extracted therefrom.

The two air flows (i.e., the bleed air A1 from the water extractor 46 and the fresh air A2 from the reheater 44) may be mixed at the turbine 64 to produce a mixed air AM. The mixed air AM leaves the turbine 64 and enters the condenser 48, where it is warmed through a heat exchanger relationship with the cool fresh air A2 output from the secondary heat exchanger 36. The conditioned mixed air AM is then sent to condition the volume 24.

The flow of the first medium A1, second medium A2, and ram air are substantially identical in both the first mode (high altitude) and second mode (low altitude) of operation. However, during the first mode of operation, at least one valve 40 is opened and cabin discharge air A3 is provided to an outflow heat exchanger 38 of the system 20 from volume 24. For example, in embodiments where only a single valve 40 is opened, the valve selected is the valve associated with the outflow heat exchanger 38 fluidly coupled to the primary heat exchanger 34. Accordingly, in the first mode of operation, initial cooling of the first medium A1 occurs by transferring heat from the hot bleed air A1 to the cabin discharge air A3 within the outflow heat exchanger 38. Operation of both valves 40 is necessary to drive the turbines 66 of each compressing device 60.

As previously described, the compressor 62 receives energy from the bleed air A1 via turbine 64 to compress the fresh air. However, this energy may not be enough to drive the compressor 62 under all operating conditions. As a result, the cabin discharge air A3 output from the outflow heat exchanger 38 is provided to power turbine 66. The supplemental energy extracted from third medium A3 within the power turbine 66 is used to increase an amount of the fresh air compressed in the compressor 62. From the power turbine, the cabin discharge air A3 is provided into the ram air circuit where it is mixed with the ram air. With the ram air circuit, the mixture of ram air and cabin discharge air A3 passes through the secondary heat exchanger 36 and the primary heat exchanger 34 before being discharged overboard. In the illustrated, non-limiting embodiment, the duct 32 includes a plurality of independent outlets 80 for expelling a medium overboard, at least one outlet being associated with each compression device 60. As shown, the duct 32 includes a first outlet 80 and a second outlet 80 separated from one another by a distance and configured to expel a medium overboard at opposing sides of the system 20.

The integrated environmental control system 20 described herein has a reduced number of components compared to conventional 2 pack systems, resulting in both a cost and weight benefit. Further, by operably coupling a ram air circuit and dehumidification system to a plurality of compression devices 60, it is possible to mount the system 20 within one or more bay's of an aircraft, such as the tail cone for example.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope hereof.

What is claimed is:

1. An environmental control system for providing conditioned air to a volume of an aircraft, comprising:
   a ram air circuit including a ram air shell having at least one heat exchanger positioned therein;
   a dehumidification system arranged in fluid communication with the ram air circuit;
   at least one compressing device arranged in fluid communication with the ram air circuit and the dehumidification system, the at least one compressing device including a first compressing device and a second compressing device, the first compressing device and the second compressing device are arranged adjacent a first side of a structural beam of the aircraft and the ram air circuit being mounted adjacent a second, opposite side of the structural beam, each of the first and second compressing devices including:
      a compressor and at least one turbine operably coupled via a shaft; and
      a fan operably coupled to the ram air circuit, the fan being located remotely from the shaft; and
   a plurality of mediums receivable within the environmental control system, the plurality of mediums including a first medium, a second medium, and a third medium, wherein a first flow of the third medium is receivable from the volume of the aircraft via a first conduit and a first valve and a second flow of the third medium is receivable from the volume of the aircraft via a second conduit and a second valve, the first conduit extending from the volume of the aircraft at a first position and the second conduit extending from the volume of the aircraft at a second position, different from the first position, the first valve and the second valve being operable independently, wherein the first flow of the third medium is provided to the at least one turbine of the first compressing device and is exhausted from the at least one turbine of the first compressing device into the ram air circuit and the second flow of the third medium is provided to the at least one turbine of the second compressing device and is exhausted from the at least one turbine of the second compressing device into the ram air circuit.

2. The environmental control system of claim 1, further comprising at least one outflow heat exchanger positioned upstream from the ram air circuit, the outflow heat exchanger being configured to transfer heat between the first medium and the third medium.

3. The environmental control system of claim 2, wherein at least one of the first valve and the second valve is operable to control at least one of the first flow of the third medium and the second flow of the third medium to the at least one outflow heat exchanger.

4. The environmental control system of claim 3, wherein the at least one outflow heat exchanger includes a first outflow heat exchanger and a second outflow heat exchanger, the first valve being operable to control the first flow of the third medium to the first outflow heat exchanger and the second valve being operable to control the second flow of the third medium to the second outflow heat exchanger.

5. The environmental control system of claim 1, wherein the first compressing device and the second compressing device are arranged non-linearly with the ram air circuit such that an axis of rotation of the fan is offset from an axis of rotation of the shaft.

6. The environmental control system of claim 1, wherein the fan is a tip turbine fan.

7. The environmental control system of claim 1, wherein the first compressing device and the second compressing device are arranged in parallel.

8. The environmental control system of claim 7, wherein the first compressing device and the second compressing device are substantially identical.

9. The environmental control system of claim 7, further comprising at least one compressing device valve operable to control a flow of one of at least one of the plurality of mediums to the first compressing device and the second compressing device.

10. The environmental control system of claim 9, wherein in a first position, the at least one compressing device valve is configured to direct the flow of at least one of the plurality of mediums to only a portion of the first compressing device and the second compressing device.

11. The environmental control system of claim 10, wherein in a second position, the at least one compressing device valve is configured to direct the flow of fluid to each of the first compressing device and the second compressing device.

12. The environmental control system of claim 1, wherein the ram air circuit includes a plurality of independent outlets formed in the shell.

13. The environmental control system of claim 1, wherein the at least one turbine of each of the first compressing device and the second compressing device includes a first turbine configured to receive the first flow and the second flow of the third medium respectively, and a second turbine, the second turbine having a first inlet and a second inlet configured to provide energy by expanding one or more of the plurality of mediums, the first inlet being configured to receive the first medium and the second inlet being configured to receive the second medium of the plurality of mediums.

14. The environmental control system of claim 13, wherein the compressor of the first compressing device and the second compressing device is configured to receive energy from at least one of the first medium and the second medium being expanded across the second turbine, the compressor being configured to compress the second medium.

15. The environmental control system of claim 13, wherein the environmental control system is operable in a plurality of modes, and during operation in at least one of the plurality of modes, the first medium and the second medium are mixed within the second turbine.

16. The environmental control system of claim 13, wherein the environmental control system is operable in a plurality of modes, and during operation in at least one of the plurality of modes, the first medium and the second medium are mixed downstream from the second turbine.

17. The environmental control system of claim 13, wherein the first compressing device and the second compressing device further includes the first turbine configured to provide energy to the compressor by expanding the third medium of the plurality of mediums.

18. The environmental control system of claim 1, wherein the third medium is cabin discharge air provided from a pressurized area of the aircraft.

19. The environmental control system of claim 1, wherein the first medium is provided to the environmental control system via a bleed air circuit, the bleed air circuit being operably coupled to a first engine, a second engine, and an auxiliary power unit.

* * * * *